(12) United States Patent
Karlsson et al.

(10) Patent No.: US 11,505,014 B2
(45) Date of Patent: Nov. 22, 2022

(54) DETERMINING A TIRE CHANGE STATUS IN A VEHICLE

(71) Applicant: Nira Dynamics AB, Linköping (SE)

(72) Inventors: Rickard Karlsson, Linköping (SE); Peter Lindskog, Linköping (SE); Andreas Hall, Linköping (SE); Daniel Murdin, Linköping (SE); Robert Johansson, Linköping (SE); Martin Lilja, Norrköping (SE)

(73) Assignee: Nira Dynamics AB, Linköping (SE)

( * ) Notice: Subject to any disclaimer, the term of this patent is extended or adjusted under 35 U.S.C. 154(b) by 351 days.

(21) Appl. No.: 16/754,383

(22) PCT Filed: Oct. 9, 2018

(86) PCT No.: PCT/EP2018/077433
§ 371 (c)(1),
(2) Date: Apr. 8, 2020

(87) PCT Pub. No.: WO2019/072822
PCT Pub. Date: Apr. 18, 2019

(65) Prior Publication Data
US 2020/0238770 A1     Jul. 30, 2020

(30) Foreign Application Priority Data
Oct. 9, 2017 (SE) .................... 1751240-1

(51) Int. Cl.
*B60C 23/06* (2006.01)
*B60C 23/04* (2006.01)
*G07C 5/00* (2006.01)

(52) U.S. Cl.
CPC ........ *B60C 23/061* (2013.01); *B60C 23/0415* (2013.01); *B60C 23/0471* (2013.01); *B60C 23/0474* (2013.01); *G07C 5/006* (2013.01)

(58) Field of Classification Search
CPC .............. B60C 23/061; B60C 23/0415; B60C 23/0471; B60C 23/0474; B60C 23/06; B60C 23/062; G07C 5/006
(Continued)

(56) References Cited

U.S. PATENT DOCUMENTS

| | | | | |
|---|---|---|---|---|
| 4,574,267 A | * | 3/1986 | Jones | ....................... B60C 23/06 340/870.11 |
| 6,385,553 B1 | * | 5/2002 | Naito | .................... B60C 23/062 73/146.2 |

(Continued)

FOREIGN PATENT DOCUMENTS

| | | |
|---|---|---|
| EP | 1272365 A1 | 1/2003 |
| EP | 1701871 A1 | 9/2006 |

(Continued)

*Primary Examiner* — Eric Blount
(74) *Attorney, Agent, or Firm* — Faegre Drinker Biddle & Reath LLP

(57) ABSTRACT

A system for determining a tire change status in a vehicle is provided. The system includes at least one processing device and a storage device. The at least one processing device may be arranged to: calculate a value of at least one reference parameter which may be used in indirect tire pressure monitoring; store the calculated value of said at least one reference parameter in the storage device; retrieve a previously stored value of said at least one reference parameter from the storage device; determine a similarity parameter based on a similarity between the calculated value and the previously stored value of said at least one reference parameter; and determine a tire change status, indicating whether or not the tires have been re-filled or replaced, by comparing said similarity parameter with a threshold.

20 Claims, 4 Drawing Sheets

(58) Field of Classification Search
USPC .......................................................... 701/29.4
See application file for complete search history.

(56) References Cited

U.S. PATENT DOCUMENTS

| | | |
|---|---|---|
| 7,263,458 B2 | 8/2007 | Hall et al. |
| 7,573,376 B2 | 8/2009 | Oshiro |
| 8,630,767 B2 | 1/2014 | Karlsson et al. |
| 8,825,267 B2 | 9/2014 | Gerdin et al. |
| 2007/0186634 A1 | 8/2007 | Burghardt et al. |
| 2008/0140276 A1* | 6/2008 | Griesser .................. G01L 17/00 73/146.2 |
| 2010/0204869 A1* | 8/2010 | Hall ...................... B60C 23/062 701/31.4 |
| 2014/0070928 A1 | 3/2014 | Yu et al. |
| 2016/0207363 A1 | 7/2016 | Sogabe |

FOREIGN PATENT DOCUMENTS

| | | |
|---|---|---|
| WO | 01/87647 A1 | 11/2001 |
| WO | 2005/068271 A1 | 7/2005 |
| WO | 2008/113378 A1 | 9/2008 |
| WO | 2011/054363 A1 | 5/2011 |
| WO | 2015/188929 A1 | 12/2015 |
| WO | 2016/198970 A1 | 12/2016 |

* cited by examiner

DETERMINING A TIRE CHANGE STATUS IN A VEHICLE

CROSS-REFERENCE TO PRIOR APPLICATIONS

This application is a § 371 National Stage Application of PCT International Application No. PCT/EP2018/077433 filed Oct. 9, 2018, which claims priority to Swedish Application No. 1751240-1 filed on Oct. 9, 2017, both of which are incorporated herein in their entirety.

TECHNICAL FIELD

The present disclosure relates generally to systems and methods for determining a tire change status in a vehicle.

BACKGROUND

Tire pressure monitoring is an important safety aspect in vehicle design, since under-inflated tires may cause accidents. Tire pressure monitoring also has a driving economy aspect, since both the fuel consumption and the tire wear may be lower if the tires of a vehicle have an optimal air pressure.

In order for a tire pressure monitoring system to give correct results, a calibration is usually needed after a tire change or re-fill. This calibration must often be triggered by the user of the vehicle, e.g. through requesting calibration when a tire change or re-fill has taken place. If the user forgets to initiate calibration of the tire pressure monitoring system after a tire change or re-fill, the system may issue erroneous alarms, or not issue alarms when needed.

When a tire pressure monitoring system detects tire under-inflation, an alarm is usually issued. The user of the vehicle is then expected to remove the cause of alarm by changing or re-filling tires. However, if the user of the vehicle decides not to remove the cause of alarm but instead just remove the alarm, e.g. by requesting recalibration, the system may no longer be able to correctly detect tire under-inflation, since it will be incorrectly calibrated.

US2016/0207363 describes a tire pressure monitoring system in which tire replacement is automatically detected based on a change in tire IDs transmitted from sensor units in the tires.

U.S. Pat. No. 7,573,376 describes a method of alarming abnormality in tire air pressure (which prevents the issuing of an erroneous alarm, or no alarm) when one tire is replaced with a new tire. When a vehicle runs after replacing one tire with a new tire, the rotational velocity of the new tire decreases due to an enlargement of the diameter of the new tire. This attribute may be used to detect that one tire has been replaced.

US2007/0186634 describes a method of determining a characteristic change in tire filling pressure which may occur e.g. when the tire filling pressure has been reset by the driver, when the tires have been re-filled, or when wheels have been replaced. The characteristic change in the tire filling pressure is determined by comparing a determined tire pressure value with a stored nominal tire pressure value.

Problems with the Prior Art

A tire pressure monitoring system comprising the automatic tire replacement detection of US2016/0207363 can only detect tire replacement if all tires are equipped with tire IDs. A tire pressure monitoring system comprising the automatic tire replacement detection of U.S. Pat. No. 7,573,376 can only detect replacement of one single tire with a new tire with a larger diameter—replacement of all tires, or replacement of one tire with a tire that has previously been used, will go undetected. Further, neither of US2016/0207363 or U.S. Pat. No. 7,573,376 enable the detection of an alarm being removed without the cause of alarm being removed.

The method of US2007/0186634 is based on comparing a determined tire pressure value with a stored nominal tire pressure value, but this only works if it is possible to determine the tire pressure. The method of US2007/0186634 thus requires the use of direct tire pressure sensors mounted in the tires.

There is therefore a need for an improved system and method for determining a tire change status in a vehicle.

SUMMARY

Indirect tire pressure monitoring may not be fully reliable at tire pressures that are very low. However, it may still be possible to determine various parameters related to the tire and its pressure, e.g. some of the parameters that are used in indirect tire pressure monitoring. Instead of comparing a determined tire pressure value with a stored tire pressure value, the value of such a parameter may be compared with a stored value of the same parameter in order to determine whether the tires have been re-filled or replaced.

The described problem is thus addressed by the claimed system for determining a tire change status in a vehicle. The system may comprise at least one processing device and a storage device. The at least one processing device may be arranged to: calculate a value of at least one reference parameter which may be used in indirect tire pressure monitoring; store the calculated value of the at least one reference parameter in the storage device; retrieve a previously stored value of the at least one reference parameter from the storage device; determine a similarity parameter based on a similarity between the calculated value and the previously stored value of the at least one reference parameter; and determine a tire change status, indicating whether or not the tires have been re-filled or replaced, by comparing said similarity parameter with a threshold. By this system, an automatic determination of a tire change status in a vehicle may be accomplished without the use of tire IDs or direct tire pressure sensors mounted in the tires.

The described problem is further addressed by the claimed method for determining a tire change status in a vehicle. The method may comprise: calculating a value of at least one reference parameter which may be used in indirect tire pressure monitoring; storing the calculated value of the at least one reference parameter; retrieving a previously stored value of the at least one reference parameter; determining a similarity parameter based on a similarity between the calculated value and the previously stored value of the at least one reference parameter; and determining a tire change status, indicating whether or not the tires have been re-filled or replaced, by comparing said similarity parameter with a threshold. By this method, an automatic determination of a tire change status in a vehicle may be accomplished without the use of tire IDs or direct tire pressure sensors mounted in the tires.

In embodiments, the tire change status is set to be TRUE if the similarity parameter is smaller than the threshold, and FALSE if the similarity parameter is not smaller than the threshold. It is of course possible to use other status denominators than TRUE and FALSE, and/or to instead determine whether the similarity parameter is greater than a threshold, as long as the determined tire change status indicates whether or not the tires have been re-filled or replaced.

In embodiments, a calibration request signal, indicating whether calibration of a tire pressure monitoring system has been requested, is received. In embodiments, the calibration request signal is ignored if the tire change status indicates that the tires have not been re-filled or replaced, such as by the tire change status being set to FALSE. The calibration request functionality may then also be re-set. Any active tire pressure warnings may also be maintained if the tire change status indicates that the tires have not been re-filled or replaced, such as by the tire change status being set to FALSE. This enables the detection of a tire pressure alarm having been removed without the cause of the tire pressure alarm having been removed.

In embodiments, a user of the vehicle is informed that a tire pressure monitoring system should be calibrated if the tire change status indicates that the tires have been re-filled or replaced, such as by the tire change status being set to TRUE. This may trigger the user to request calibration of the tire pressure monitoring system. Such information may also be indirect, through e.g. being saved in a diagnosing tool for the vehicle.

In embodiments, a tire pressure monitoring system is automatically calibrated if the tire change status indicates that the tires have been re-filled or replaced, such as by the tire change status being set to TRUE. The automatic calibration may e.g. be the same as the calibration normally carried out when calibration is requested by a user.

In embodiments, the previously stored value of the at least one reference parameter which may be used in indirect tire pressure monitoring is a value stored during a preceding ignition cycle of the vehicle. When a tire re-fill or replacement is made, the engine is usually shut off, so it may be more relevant to determine the similarity between values from different ignition cycles. The preceding ignition cycle should preferably be the immediately preceding ignition cycle, so that the similarity between values from two consecutive ignition cycles may be determined.

In embodiments, the determining of the similarity parameter based on a similarity between the calculated value and the previously stored value of the at least one reference parameter which may be used in indirect tire pressure monitoring involves the use of a machine learning algorithm, which may e.g. have been trained using a large amount of test data. The test data may relate to a single reference parameter, or to a number of different reference parameters.

In embodiments, the at least one reference parameter which may be used in indirect tire pressure monitoring is at least one of a resonance frequency, the longitudinal stiffness or slip slope, and/or the relative difference in wheel radii between tires of the vehicle.

In embodiments, the values of the at least one reference parameter which may be used in indirect tire pressure monitoring are values of vectors, each vector comprising values of a number of different reference parameters. This simplifies a determination of tire change status based on a combination of different reference parameters which may be used in indirect tire pressure monitoring.

In embodiments, the at least one processing device is an Electronic Control Unit (ECU) of the vehicle.

In embodiments, the at least one processing device is a number of different processing devices, between which signals are transmitted.

The determined tire change status may be used in many different vehicle systems. The tire change status may e.g. be used for determining whether calibration of a tire pressure monitoring system is needed, and/or for optimizing the performance of a vehicle system such as e.g. the Electronic Stability Control (ESC).

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1:
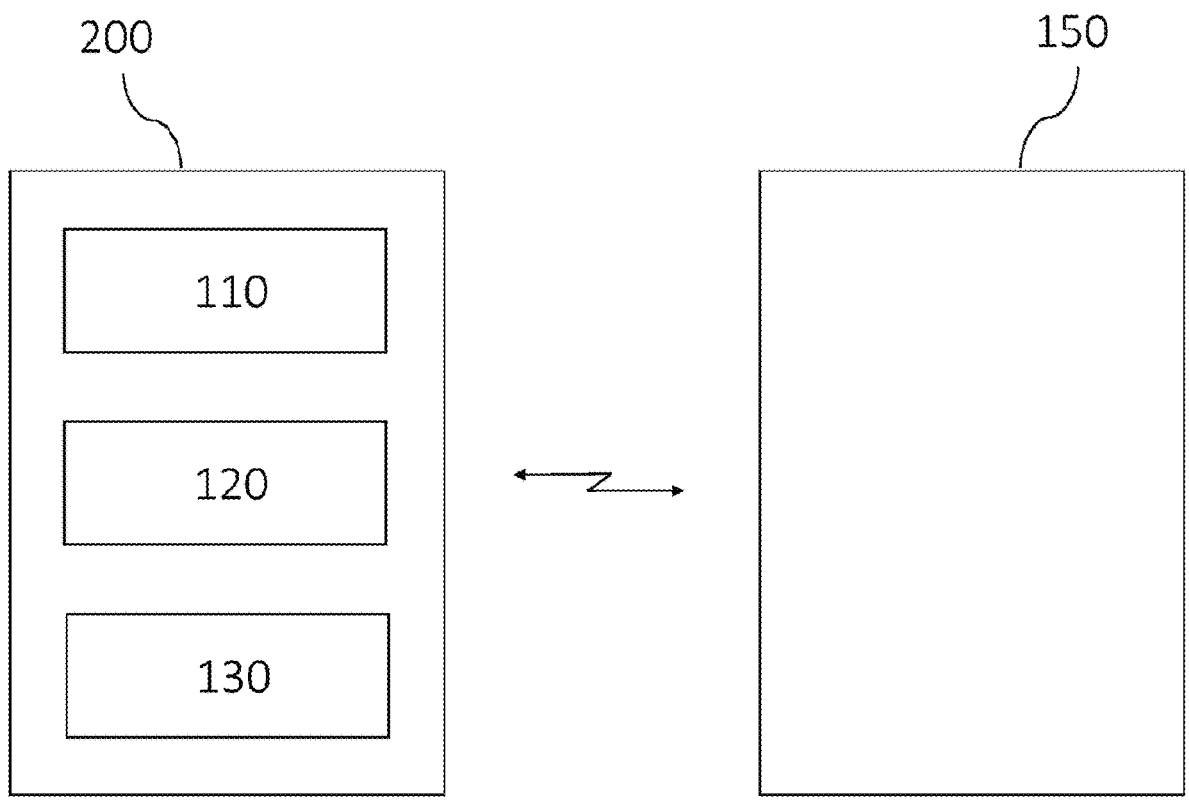
FIG. 1 schematically illustrates a system for determining a tire change status in a vehicle, in accordance with one or more embodiments described herein.

Tire pressure monitoring is an important safety aspect in vehicle design, since under-inflated tires may cause accidents. Tire pressure monitoring also has a driving economy aspect, since both the fuel consumption and the tire wear may be lower if the tires of a vehicle have an optimal air pressure. In order for a tire pressure monitoring system to give correct results, a calibration is usually needed after a tire change. Automatic detection of tire change enables automatic initiation of such a calibration, or may be a trigger for a user of the vehicle to request such a calibration.

Tire pressure monitoring may be direct, using tire pressure sensors mounted in the tires, or indirect. There are many different ways of performing indirect tire pressure monitoring. Indirect tire pressure monitoring may e.g. involve a wheel radius analysis and a wheel vibration analysis, e.g. as described in U.S. Pat. No. 7,263,458, and/or longitudinal and/or lateral vehicle dynamics, e.g. as described in EP1272365.

In the wheel radius analysis described in U.S. Pat. No. 7,263,458, wheel radii are estimated by comparing the wheel speeds of each vehicle wheel (which may e.g. be measured by wheel speed sensors) with the vehicle's actual driving velocity. Constant driving velocity provided, the wheel speed increases when the wheel radius decreases due to tire pressure loss.

In the wheel vibration analysis described in U.S. Pat. No. 7,263,458, wheel vibration phenomena (which may be measured by wheel speed sensors) are detected within the time dependent behavior of the rotational velocity of an individual vehicle wheel. The spectral properties (e.g. the energy distribution in different frequency bands) of a wheel angular velocity signal depends on the tire pressure of the individual vehicle wheel. If the spectral properties of a wheel changes over time, this may thus be an indication of tire under-inflation.

The combination of a wheel radius analysis and a wheel vibration analysis increases the certainty of the determination of which wheel that has an under-inflation problem. If the results of both these analyses correspond, it is likely that the correct wheel has been identified. Fusion of the wheel radius analysis and the wheel vibration analysis thus increases the certainty of indirect tire pressure monitoring.

EP1272365 describes indirect tire pressure monitoring involving the estimation of parameters such as the longitudinal stiffness or slip slope k, the relative difference in wheel radii δ between tires, and the resonance frequency $\omega_{res}$.

A number of different factors may be taken into account in indirect tire pressure monitoring. In addition to the parameters used in U.S. Pat. No. 7,263,458 and EP1272365, vehicle specific parameters, information about absolute velocity, load changes, friction, etc. may be used to improve indirect tire pressure monitoring. These different factors may be combined using algorithms that can be determined using e.g. historical data. Indirect tire pressure monitoring may e.g. involve machine learning, e.g. using a neural network that may be trained using training data for different scenarios where wheel properties such as the tire pressure is known.

Vehicle specific parameters may e.g. be information regarding whether the vehicle is front wheel driven, rear wheel driven or all wheel driven. This information may be provided to the system, or even be used to select an appropriate algorithm—it may be advantageous to use different algorithms for different types of vehicles.

Information about the type of tire, and/or whether snow chains have been mounted on any of the wheels, may also be used to improve indirect tire pressure monitoring. Since different types of tires have different properties, they may react differently when the tire pressure changes. A wheel vibration analysis may thus give different results depending on the properties of the tire. A tire classification method is described in WO2015/188929. Further, a wheel vibration analysis will of course be affected by whether snow chains are mounted on the wheel.

Information about load changes in the vehicle may e.g. be used to compensate for wheel radius and/or wheel vibration differences that are unrelated to any problems with the wheels. If the vehicle is loaded unevenly, or moves uphill or downhill, a wheel radius analysis and a wheel vibration analysis will detect anomalies even though there is no wheel related problem. In order to avoid false alarms or nuisance warnings, it is therefore advantageous to compensate for load changes.

Load changes may be determined e.g. using information about axle height, longitudinal acceleration, vertical acceleration, torque, engine RPM, altitude, yaw rate, pitch, roll, and/or signals from the suspension system, such as suspension compression factors in an air suspension system. U.S. Pat. No. 8,630,767 describes how the load of a vehicle can be estimated based on vehicle data indicative of a current driving situation, and U.S. Pat. No. 8,825,267 describes the use of suspension information in tire pressure deviation detection for a vehicle tire. Various flags set in the at least one vehicle processor based on whether the vehicle is braking, shifting gears, reversing or has a trailer attached may assist in the determination of load changes. GPS information together with map data comprising terrain information may also assist in the determination of load changes.

Further, information about the friction between the tire and the road surface may be used to compensate for wheel radius and/or wheel vibration differences that are unrelated to any problems with the wheels. If the wheels slip, this may affect the determination of the wheel radius and/or the wheel vibration. Any information that can be used to determine slip of the wheels that is unrelated to any problems with the wheels may therefore be used to improve indirect tire pressure monitoring. EP1701871 and WO2011/054363 describe various types of road condition monitoring. If it can e.g. be determined that the road condition is different for different wheels, e.g. because the vehicle is driving close to the edge of a road so that the right wheels are driving in gravel although the left wheels are driving on asphalt, this information may be used to improve indirect tire pressure monitoring. Information from a temperature sensor may also assist in determining friction, especially at low temperatures.

The present disclosure relates generally to systems and methods for determining a tire change status in a vehicle. The determined tire change status may be used in many different vehicle systems. The tire change status may e.g. be used for determining whether calibration of a tire pressure monitoring system is needed, and/or for optimizing the performance of various vehicle systems, such as e.g. the Electronic Stability Control (ESC) of the vehicle. Embodiments of the disclosed solution are presented in more detail in connection with the figures.

FIG. 1 schematically illustrates a system 100 for determining a tire change status $P_c$ in a vehicle, in accordance with one or more embodiments described herein. The system 100 comprises at least one processing device 110 and a storage device 130. The at least one processing device 110 may be arranged to: calculate a value $V_2$ of at least one reference parameter which may be used in indirect tire pressure monitoring; store the calculated value $V_2$ of the at least one reference parameter in the storage device 130; retrieve a previously stored value $V_1$ of the at least one reference parameter from the storage device 130; determine a similarity parameter $P_s$ based on a similarity between the calculated value $V_2$ and the previously stored value $V_1$ of the at least one reference parameter; and determine a tire change status $P_c$, indicating whether or not the tires have been re-filled or replaced, by comparing said similarity parameter $P_s$ with a threshold T. The system 100 may also comprise a user interface 120, through which a calibration request signal may be received.

The at least one reference parameter which may be used in indirect tire pressure monitoring may be any of the parameters that are calculated by a tire pressure monitoring system during indirect tire pressure monitoring. The at least one reference parameter may e.g. be a frequency property of the tire, such as one or more resonance frequencies $\omega_{res}$. EP1272365 describes one way of determining a resonance frequency $\omega_{res}$ for a tire. The frequency properties may e.g. be analyzed in order to determine the energy content and/or the shape of the eigenmode frequency curve. The at least one reference parameter may e.g. be the energy content or the shape, such as e.g. the relative width, of the eigenmode frequency curve. If the spectral properties of a wheel changes over time, this may be an indication of tire under-inflation, but an abrupt change in spectral properties may also be an indication of a tire re-fill or replacement.

The at least one reference parameter which may be used in indirect tire pressure monitoring may additionally, or alternatively, be e.g. the longitudinal stiffness or slip slope k, and/or the relative difference in wheel radii δ between tires, as described in EP1272365, and/or the change in wheel radius, the energy distribution in different frequency bands in the time dependent behavior of the rotational velocity, and/or or more resonance frequencies and/or damping factors, as described in U.S. Pat. No. 7,263,458.

The similarity parameter $P_s$ may be any parameter that indicates the similarity between the calculated value $V_2$ and the previously stored value $V_1$ of the at least one reference parameter which may be used in indirect tire pressure monitoring. If $V_2$ and $V_1$ are not very similar, this is an indication that the tires have been re-filled or replaced, while if $V_2$ and $V_1$ have a strong similarity, this is an indication that the tires have not been re-filled or replaced. If the size of the similarity parameter $P_s$ is related to the similarity between $V_2$ and $V_1$, the tire change status $P_c$ may be determined by comparing the similarity parameter $P_s$ with a threshold T.

The similarity parameter $P_s$ may be determined in any suitable way, as long as the size of the similarity parameter $P_s$ is related to the similarity between $V_2$ and $V_1$. The similarity parameter $P_s$ may e.g. be calculated using the equation $P_s=\exp(-0.5(V_2-V_1)^2/S^2)$, where S is an a priori given parameter related to the possible range of the parameter in question. The similarity parameter $P_s$ may also be determined using machine learning, e.g. using a machine learning algorithm which has been trained using a large amount of test data. The test data may relate to a single reference parameter, or to a number of different reference parameters. If the system 100 comprises an external processing device 150, which may e.g. be cloud based, machine learning may e.g. be used by training a machine learning algorithm using values $V_1$, $V_2$ of reference parameters from a large number of vehicles. The determination of the similarity parameter $P_s$ may also be distributed between a vehicle processing device 110 and an external processing device 150, e.g. as described in the co-pending SE1750775-7.

The similarity parameter $P_s$ may e.g. be calculated based on values $V_1$, $V_2$ for a number of different reference parameters, which may be combined in various ways, e.g. using dynamic filters, a static evaluation of averages, or machine learning. Alternatively, the similarity parameter $P_s$ may be calculated separately for a number of different parameters, and the total similarity parameter may then be determined by combining these similarity parameters $P_s$, e.g. using multiplication, averaging, or calculating the median value of the different similarity parameters $P_s$.

The values $V_1$, $V_2$ of the at least one reference parameter which may be used in indirect tire pressure monitoring may be just calculated values $V_1$, $V_2$ of one or more reference parameters, which values may e.g. be filtered and/or averaged over time in any suitable manner. However, the values $V_1$, $V_2$ of the at least one reference parameter may also be values $V_1$, $V_2$ of vectors, each vector comprising values of a number of different reference parameters. The values $V_1$ and $V_2$ of the vectors may then also e.g. be filtered and/or averaged over time in any suitable manner.

Figure 2:
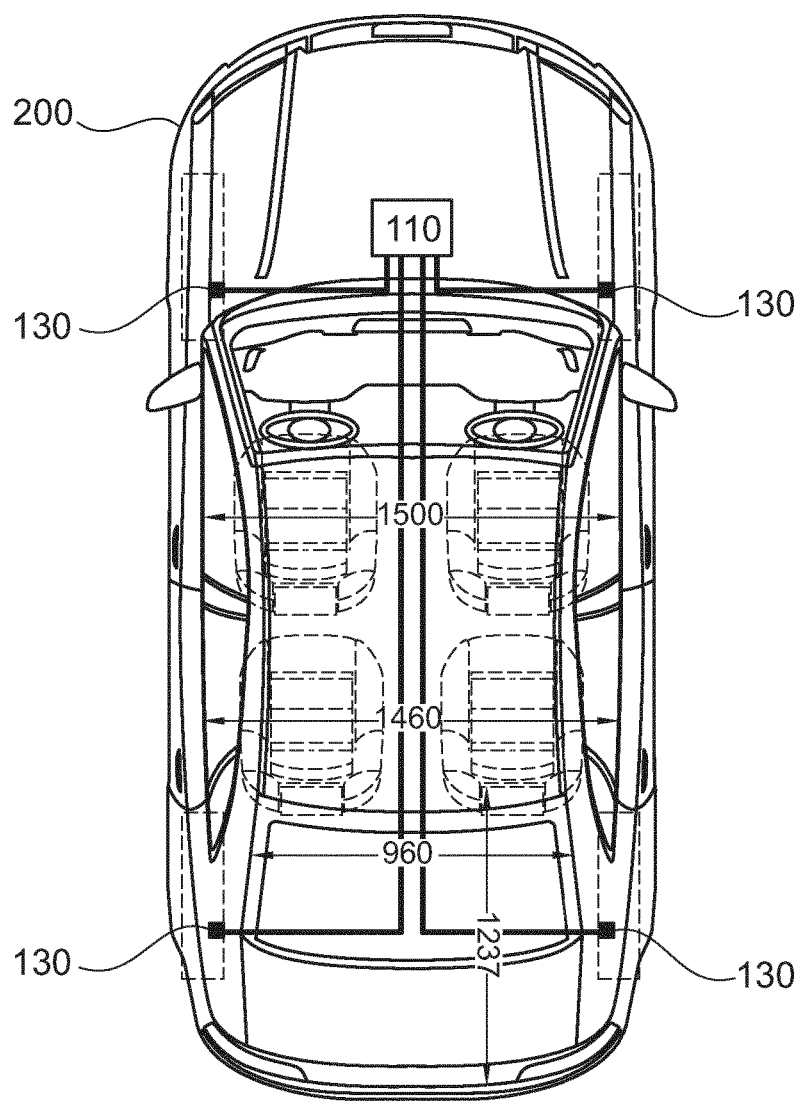
FIG. 2 schematically illustrates a vehicle, in accordance with one or more embodiments described herein.

FIG. 2 schematically illustrates a vehicle 200, in accordance with one or more embodiments described herein. The vehicle 200 comprises at least one processing device 110, which may e.g. be an ECU of the vehicle 200. The at least one processing device 110 may be arranged anywhere in the vehicle 200. The vehicle 200 shown in FIG. 2 further comprises four rotational speed sensors 130, one for each wheel. The signals from the sensors 130 are transmitted to the at least one processing device 110, where they may be used as a basis for determining a tire change status $P_c$ in the vehicle 200.

The sensors 130 may also be other types of sensors. For determining load changes in the vehicle, information about e.g. the torque and the engine RPM may be needed, and this can e.g. be determined based on measurements from various engine sensors. A pressure sensor such as e.g. a barometer may be used to determine the altitude, and based on this determine whether the vehicle is driving uphill or downhill. Various types of accelerometers and/or gyroscopes, e.g. in the form of an inertial measurement unit (IMU), may be used to determine e.g. yaw rate, pitch, roll, longitudinal acceleration, lateral acceleration and vertical acceleration, to be used for determining load changes and/or other vehicle dynamics properties in the vehicle. Axle height information may e.g. be provided by sensors which are arranged in the vehicle for adapting the direction of the vehicle lights. The absolute velocity may e.g. be determined using a GPS sensor, or using another velocity recognizing sensor such as a camera, a radar, an IR sensor, or a laser sensor. Information from a temperature sensor may assist in determining both friction and tire change status $P_C$.

Figure 3:
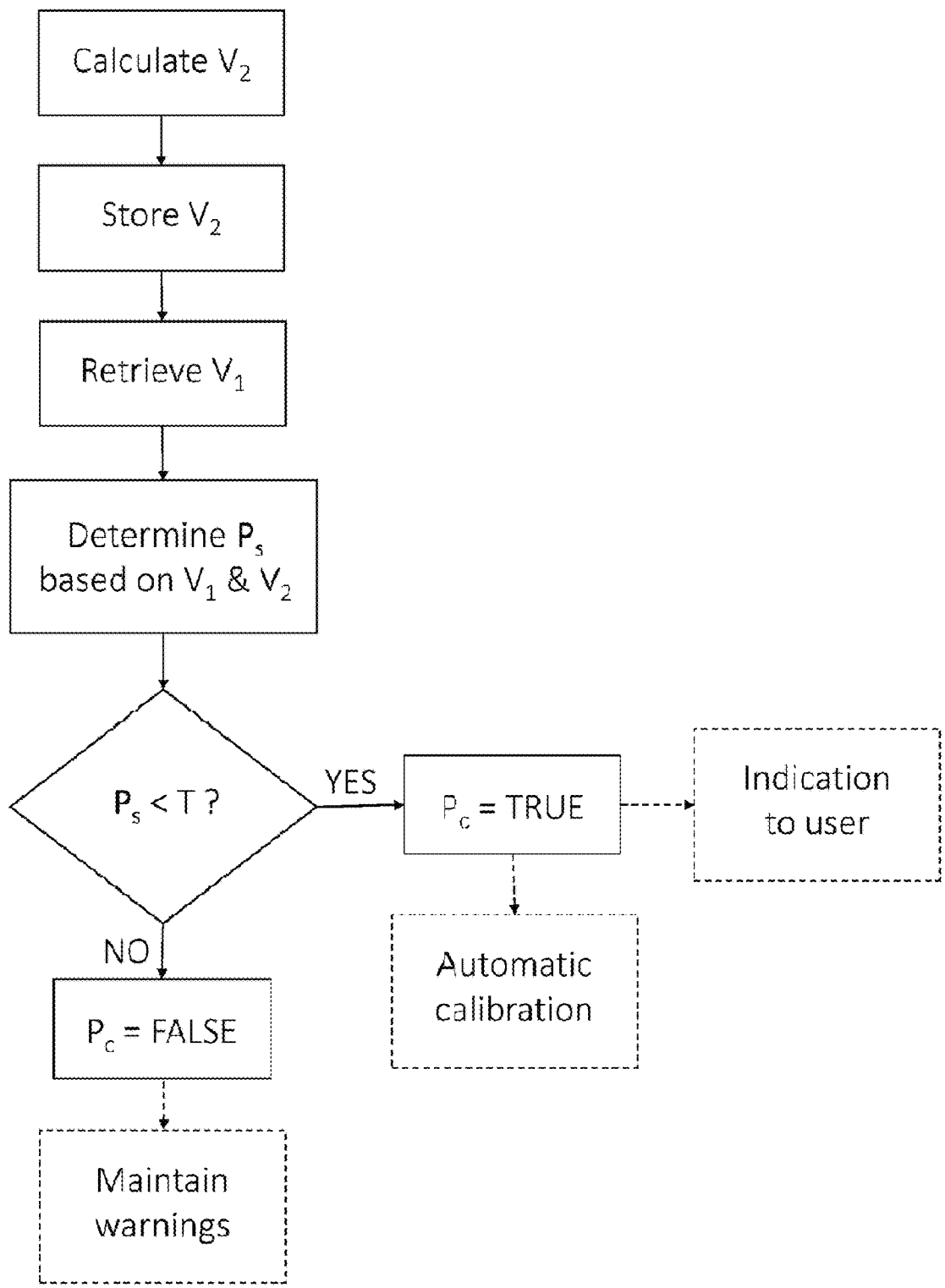
FIG. 3 schematically illustrates a flow diagram for an example method for determining a tire change status in a vehicle, in accordance with one or more embodiments described herein.

FIG. 3 schematically illustrates a flow diagram for an example method of determining a tire change status $P_c$ in a vehicle, in accordance with one or more embodiments described herein. According to the flow diagram, a value $V_2$ of at least one reference parameter which may be used in indirect tire pressure monitoring is calculated and stored, a previously stored value $V_1$ of the at least one reference parameter is retrieved, and a similarity parameter $P_s$ is determined based on a similarity between the values V, and $V_2$ of the at least one reference parameter. A tire change status $P_c$, indicating whether or not the tires have been re-filled or replaced, is then determined by comparing the similarity parameter $P_s$ with a threshold T.

One way of determining the tire change status $P_c$ is to evaluate whether the similarity parameter $P_s$ is smaller than a threshold T. If the similarity parameter $P_s$ is smaller than the threshold T, this indicates that there is a clear difference between the values $V_1$ and $V_2$, and this is an indication that the tires have been re-filled or replaced. The tire change status $P_c$ may then be determined to be TRUE. If the similarity parameter $P_s$ is not smaller than the threshold T, the tire change status $P_c$ may be determined to be FALSE. It is of course possible to use other status denominators than TRUE and FALSE, and/or to instead determine whether the similarity parameter $P_s$ is greater than a threshold (if the similarity parameter e.g. indicates the difference between $V_1$ and $V_2$ instead of the similarity between $V_1$ and $V_2$), as long as the determined tire change status $P_c$ indicates whether or not the tires have been re-filled or replaced.

If the tire change status $P_c$ indicates that the tires have not been re-filled or replaced, such as by the tire change status $P_c$ being set to FALSE, any active tire pressure warnings may be maintained and any calibration request signals may be ignored. If the tire change status $P_c$ indicates that the tires have been re-filled or replaced, such as by the tire change status $P_c$ being set to TRUE, the user may be informed that a tire pressure monitoring system should be calibrated, or the tire pressure monitoring system may be automatically calibrated. The automatic calibration may e.g. be the same as the calibration normally carried out when calibration is requested by a user.

The threshold T may be a simple threshold value, but it may also be multi-dimensional, e.g. a curve in a two-dimensional plane (in case $V_1$ and $V_2$ are two-dimensional vectors). The threshold T may be determined in different ways, and it may also be adaptable. In situations where it is desirable not to miss the detection of a tire change, the threshold may be set high, at the cost of sometimes incorrectly detecting a tire change. This may e.g. be the case in situations where a calibration of a tire pressure monitoring system is needed after a tire change, and the tire pressure monitoring system may not function properly without this calibration. It may in such situations be less problematic to make calibrations even though there was no tire change than not to calibrate the system after a tire change. Alternatively, in situations where it is desirable never to erroneously detect a tire change, the threshold T may be set low. The threshold T may e.g. be set based on various types of vehicle monitoring data. The threshold T may also be affected by a determination of whether the values $V_1$ and $V_2$ belong to the same ignition cycle, or whether the engine has been shut off between $V_1$ and $V_2$. When a tire re-fill or replacement is made, the engine is usually shut off, so it may be advantageous to use a different threshold T if $V_1$ and $V_2$ are within the same ignition cycle.

Figure 4:
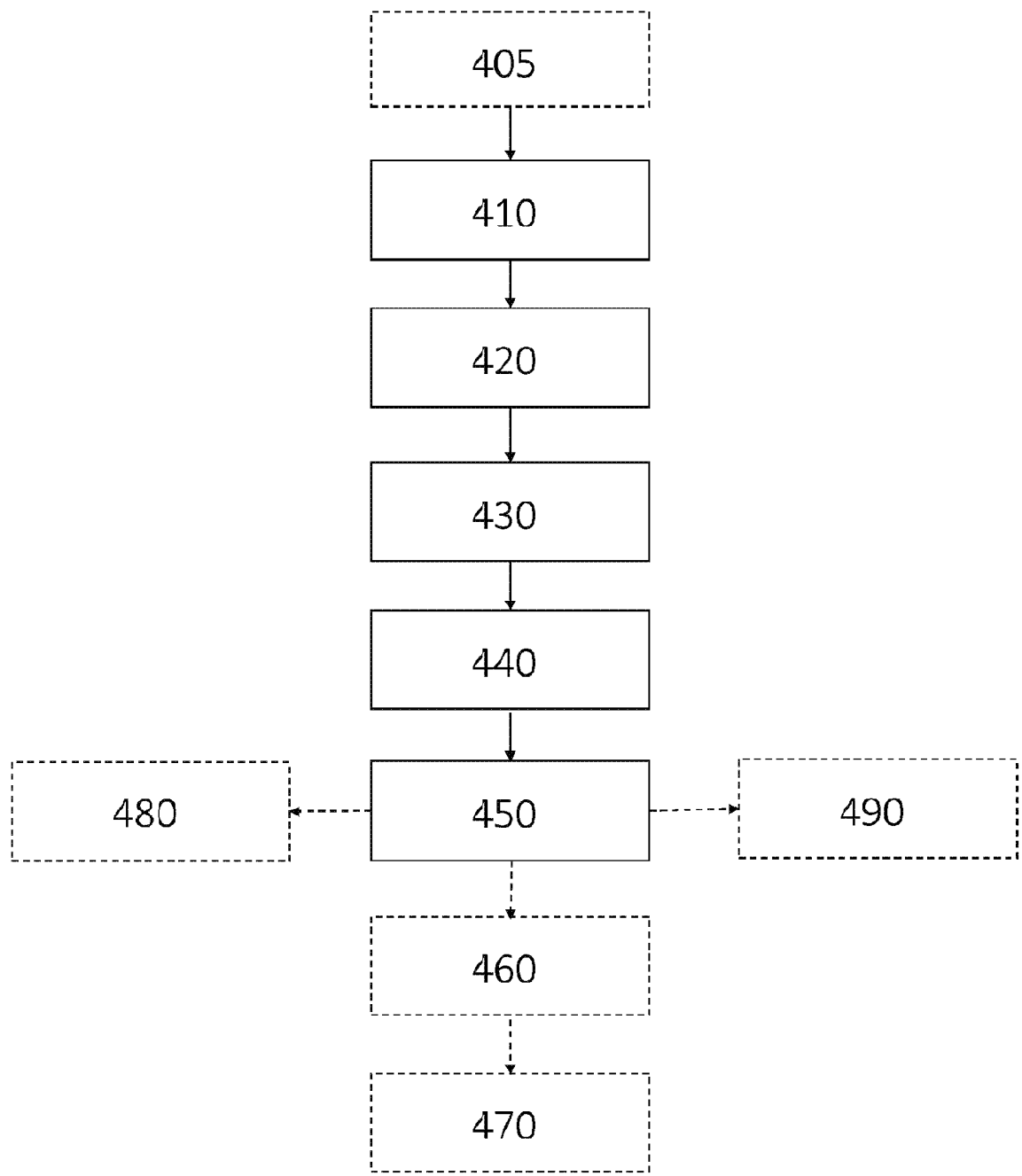
FIG. 4 schematically illustrates a method for determining a tire change status in a vehicle, in accordance with one or more embodiments described herein.

FIG. 4 schematically illustrates a method 400 for determining a tire change status $P_c$ in a vehicle, in accordance with one or more embodiments described herein. The method 400 may comprise:

Step 410: calculating a value $V_2$ of at least one reference parameter which may be used in indirect tire pressure monitoring.

Step 420: storing the calculated value $V_2$ of the at least one reference parameter.

Step 430: retrieving a previously stored value $V_1$ of the at least one reference parameter.

Step 440: determining a similarity parameter $P_s$ based on a similarity between the calculated value $V_2$ and the previously stored value $V_1$ of the at least one reference parameter.

Step 450: determining a tire change status $P_c$, indicating whether or not the tires have been re-filled or replaced, by comparing said similarity parameter $P_s$ with a threshold T.

By this method, an automatic determination of a tire change status $P_c$ in a vehicle may be accomplished without the use of tire IDs or direct tire pressure sensors mounted in the tires.

In embodiments, the tire change status $P_c$ is set to be TRUE if the similarity parameter is smaller than the threshold T, and FALSE if the similarity parameter is not smaller than the threshold T. It is of course possible to use other status denominators than TRUE and FALSE, and/or to instead determine whether the similarity parameter $P_s$ is greater than a threshold, as long as the determined tire change status $P_c$ indicates whether or not the tires have been re-filled or replaced.

In embodiments, the previously stored value $V_1$ of the at least one reference parameter which may be used in indirect tire pressure monitoring is a value stored during a preceding ignition cycle of the vehicle. When a tire re-fill or replacement is made, the engine is usually shut off, so it may be more relevant to determine the similarity between values from different ignition cycles. The preceding ignition cycle should preferably be the immediately preceding ignition cycle, so that the similarity between values from two consecutive ignition cycles may be determined.

In embodiments, the determining 440 of the similarity parameter $P_s$ based on a similarity between the calculated value $V_2$ and the previously stored value $V_1$ of the at least one reference parameter which may be used in indirect tire pressure monitoring involves the use of a machine learning algorithm. The machine learning algorithm may e.g. have been trained using a large amount of test data.

In embodiments, the at least one reference parameter which may be used in indirect tire pressure monitoring is at least one of a resonance frequency $\omega_{res}$, the longitudinal stiffness or slip slope k, and/or the relative difference in wheel radii $\delta$ between tires of the vehicle.

In embodiments, the values $V_1$, $V_2$ of the at least one reference parameter which may be used in indirect tire pressure monitoring are values $V_1$, $V_2$ of vectors, each vector comprising values of a number of different reference parameters which may be used in indirect tire pressure monitoring. This is one way of determining tire change status $P_c$ based on a combination of different reference parameters.

The method 400 may further comprise one or more of the following:

Step 405: receiving a calibration request signal, indicating whether calibration of the tire pressure monitoring system has been requested.

Step 460: ignoring the calibration request signal if the tire change status $P_c$ indicates that the tires have not been re-filled or replaced, such as by the tire change status $P_c$ being set to FALSE. The calibration request functionality may then also be re-set.

Step 470: maintaining any active tire pressure warnings if the tire change status $P_c$ indicates that the tires have not been re-filled or replaced, such as by the tire change status $P_c$ being set to FALSE.

This enables the detection of a tire pressure alarm being removed without the cause of the tire pressure alarm being removed, such as by the user requesting calibration without handling the under-inflation issue.

Step 480: informing a user of the vehicle that the tire pressure monitoring system should be calibrated if the tire change status $P_c$ indicates that the tires have been re-filled or replaced, such as by the tire change status $P_c$ being set to TRUE. This may trigger the user to request calibration of the tire pressure monitoring system. Such information may also be indirect, through e.g. being saved in a diagnosing tool of the vehicle 200.

Step 490: automatically calibrating the tire pressure monitoring system if the tire change status $P_c$ indicates that the tires have been re-filled or replaced, such as by the tire change status $P_c$ being set to TRUE. The automatic calibration may e.g. be the same as the calibration normally carried out when calibration is requested by a user.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure. Accordingly, the scope of the invention is defined only by the claims.

The invention claimed is:

1. A system for determining a tire change status in a vehicle, the system comprising at least one processing device and a storage device, wherein the at least one processing device is arranged to:
   calculate a value of at least one reference parameter which may be used in indirect tire pressure monitoring;
   store the calculated value of said at least one reference parameter in the storage device;
   retrieve a previously stored value of said at least one reference parameter from the storage device;
   determine a similarity parameter based on a similarity between the calculated value and the previously stored value of said at least one reference parameter; and
   determine a tire change status, indicating whether or not the tires have been re-filled or replaced, by comparing said similarity parameter with a threshold.

2. The system according to claim 1, wherein the tire change status is set to be TRUE if said similarity parameter is smaller than the threshold, and FALSE if said similarity parameter is not smaller than the threshold.

3. The system according to claim 1, further comprising a user interface, wherein the at least one processing device is arranged to receive a calibration request signal, indicating whether calibration of a tire pressure monitoring system has been requested, from the user interface.

4. The system according to claim 3, wherein the at least one processing device is arranged to ignore the calibration request signal and maintain any active tire pressure warnings if the tire change status indicates that the tires have not been re-filled or replaced.

5. The system according to claim 1, wherein the at least one processing device is arranged to inform a user of the vehicle that a tire pressure monitoring system should be calibrated if the tire change status indicates that the tires have been re-filled or replaced.

6. The system according to claim 1, wherein the at least one processing device is arranged to automatically calibrate a tire pressure monitoring system if the tire change status indicates that the tires have been re-filled or replaced, such as by the tire change status being set to TRUE.

7. The system according to claim 1, wherein the previously stored value of said at least one reference parameter which may be used in indirect tire pressure monitoring is a value stored during a preceding ignition cycle of the vehicle.

8. The system according to claim 1, wherein the determination of said similarity parameter based on a similarity between the calculated value and the previously stored value of the at least one reference parameter which may be used in indirect tire pressure monitoring involves the use of a machine learning algorithm.

9. The system according to claim 1, wherein said at least one reference parameter which may be used in indirect tire pressure monitoring is at least one of a resonance frequency, the longitudinal stiffness or slip slope, or the relative difference in wheel radii between tires of the vehicle.

10. The system according to claim 1, wherein the values of the at least one reference parameter which may be used in indirect tire pressure monitoring are values of vectors, each vector comprising values of a number of different reference parameters.

11. A method for determining a tire change status in a vehicle including at least one processing device and a storage device, the method comprising:
calculating a value of at least one reference parameter which may be used in indirect tire pressure monitoring;
storing the calculated value of said at least one reference parameter in the storage device;
retrieving a previously stored value of said at least one reference parameter;
determining a similarity parameter based on a similarity between the calculated value and the previously stored value of said at least one reference parameter; and
determining a tire change status, indicating whether or not the tires have been re-filled or replaced, by comparing said similarity parameter with a threshold.

12. The method according to claim 11, wherein the tire change status is set to be TRUE if said similarity parameter is smaller than the threshold, and FALSE if said similarity parameter is not smaller than the threshold.

13. The method according to claim 11, further comprising receiving a calibration request signal, indicating whether calibration of a tire pressure monitoring system has been requested.

14. The method according to claim 13, further comprising ignoring the calibration request signal and maintaining any active tire pressure warnings if the tire change status indicates that the tires have not been re-filled or replaced.

15. The method according to claim 11, further comprising informing a user of the vehicle that a tire pressure monitoring system should be calibrated if the tire change status indicates that the tires have been re-filled or replaced.

16. The method according to claim 11, further comprising automatically calibrating a tire pressure monitoring system if the tire change status indicates that the tires have been re-filled or replaced.

17. The method according to claim 11, wherein the retrieving comprises retrieving the previously stored value of said at least one reference parameter which may be used in indirect tire pressure monitoring from a preceding ignition cycle of the vehicle.

18. The method according to claim 11, wherein the determining of said similarity parameter based on a similarity between the calculated value and the previously stored value of the at least one reference parameter which may be used in indirect tire pressure monitoring involves the use of a machine learning algorithm.

19. The method according to claim 11, wherein said at least one reference parameter which may be used in indirect tire pressure monitoring is at least one of a resonance frequency, the longitudinal stiffness or slip slope, or the relative difference in wheel radii between tires of the vehicle.

20. The method according to claim 11, wherein the values of said at least one reference parameter which may be used in indirect tire pressure monitoring are values of vectors, each vector comprising values of a number of different reference parameters.

* * * * *